United States Patent
Hatipoglu et al.

(10) Patent No.: US 9,003,826 B2
(45) Date of Patent: Apr. 14, 2015

(54) ARRANGEMENT FOR STARTING A SINGLE PHASE INDUCTION MOTOR

(75) Inventors: Oner Hatipoglu, Istanbul (TR); Ahmet Ihsan Yuce, Istanbul (TR); Mustafa Yuksel, Istanbul (TR); Mucahit Bacaksiz, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 317 days.

(21) Appl. No.: 13/322,105

(22) PCT Filed: May 13, 2010

(86) PCT No.: PCT/EP2010/056635
§ 371 (c)(1),
(2), (4) Date: Jan. 20, 2012

(87) PCT Pub. No.: WO2010/133513
PCT Pub. Date: Nov. 25, 2010

(65) Prior Publication Data
US 2012/0159984 A1    Jun. 28, 2012

(30) Foreign Application Priority Data
May 22, 2009 (TR) .............................. a 2009/03981

(51) Int. Cl.
| H02P 1/44 | (2006.01) |
| H02P 1/42 | (2006.01) |
| F25B 1/00 | (2006.01) |
| H02P 23/00 | (2006.01) |
| H02P 27/00 | (2006.01) |
| H02P 25/04 | (2006.01) |

(52) U.S. Cl.
CPC ......................................... *H02P 1/42* (2013.01)

(58) Field of Classification Search
USPC .................................. 62/323.3, 469, 498, 505
See application file for complete search history.

(56) References Cited

U.S. PATENT DOCUMENTS

| 4,348,734 A | * | 9/1982 | Dougherty .................... 708/276 |
| 4,395,671 A | | 7/1983 | Sandler et al. |
| 4,720,763 A | * | 1/1988 | Bauer ........................... 361/154 |
| 5,200,684 A | * | 4/1993 | Fisher ........................... 318/809 |
| 5,506,486 A | * | 4/1996 | Hayashi et al. ............... 318/808 |

(Continued)

FOREIGN PATENT DOCUMENTS

| WO | 2005/053147 A1 | 6/2005 |
| WO | WO 2005053147 A1 * | 6/2005 |

(Continued)

*Primary Examiner* — Paul Ip
*Assistant Examiner* — Said Bouziane
(74) *Attorney, Agent, or Firm* — Venjuris, P.C.

(57) ABSTRACT

The motor (1) of the present invention is fed by the mains voltage (Vac), and comprises a main winding (MW), an auxiliary winding (AW), a first triac (2) connected in series to the auxiliary winding (AW) which provides to start up the motor (1) by being actuated at the moment of start up in order to operate the motor (1), a second triac (3) connected in series to the main winding (MW) which provides the motor (1) to continue operating and a control unit (4) which controls the start up and operation of the motor (1) by actuating the triacs (2 and 3) when required.

7 Claims, 1 Drawing Sheet

(56) References Cited

U.S. PATENT DOCUMENTS

Figure 1:
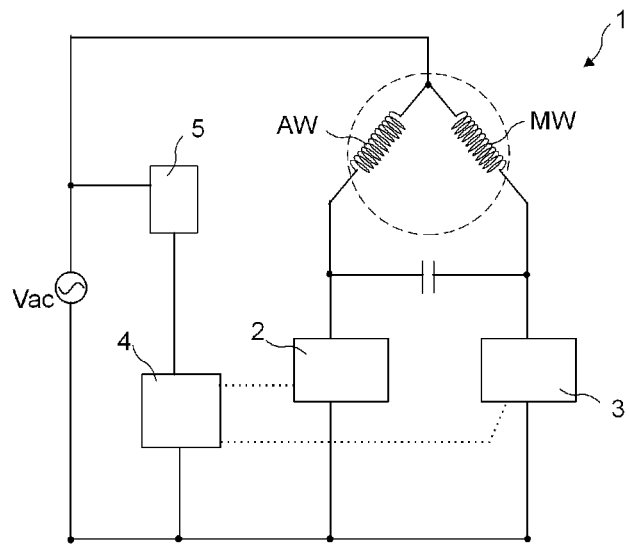

| | | | | |
|---|---|---|---|---|
| 5,994,883 A * | 11/1999 | Liu | ............................... | 323/237 |
| 7,095,138 B1 * | 8/2006 | Brunier | ........................... | 307/43 |
| 7,310,253 B2 * | 12/2007 | Fujii et al. | ....................... | 363/98 |
| 7,630,180 B2 * | 12/2009 | Schmidt et al. | ................. | 361/28 |
| 8,004,231 B2 * | 8/2011 | Gonthier et al. | .............. | 318/751 |
| 8,120,272 B2 * | 2/2012 | Imam et al. | ................... | 315/291 |
| 8,498,136 B2 * | 7/2013 | Shinomoto et al. | ........... | 363/125 |

| | | | | |
|---|---|---|---|---|
| 2006/0284590 A1 * | 12/2006 | Bruno | ........................... | 318/812 |
| 2007/0057647 A1 | 3/2007 | Burkhart et al. | | |
| 2007/0273429 A1 * | 11/2007 | Ribeiro Duarte | ............. | 327/452 |

FOREIGN PATENT DOCUMENTS

| | | |
|---|---|---|
| WO | 2008/113140 A1 | 3/2007 |
| WO | WO 2008113140 A1 * | 9/2008 |

* cited by examiner

ARRANGEMENT FOR STARTING A SINGLE PHASE INDUCTION MOTOR

The present invention relates to a motor wherein the start up conditions are improved.

In some of the state of the art household appliances, particularly in cooling devices, a single phase motor is utilized. The motor is driven by a circuit which actuates two windings, a main winding and an auxiliary winding. The main winding and the auxiliary winding are actuated together at the start and the required torque for starting up the motor is provided. After the motor start up is realized, the auxiliary winding is not actuated and the motor continues to operate by triggering the main winding.

Calculation of the voltage value providing the required torque for motor start up is of utmost importance in order to realize motor start up even in low voltage. However fluctuations in the mains voltage also result in variability of the voltage delivered to the motor circuit.

In the state of the art, various methods are utilized in order to provide the optimum voltage required for the start up of the motor. Some of these methods relate to determining the time period during which the auxiliary winding stays activated by measuring the mains voltage and some relate to deactivating the auxiliary winding after determining the motor has started up by measuring the voltage reached in the main winding.

In the state of the art International Patent Application No. WO 2005053147 a compressor having a control unit which checks the frequency of mains voltage at 90 degrees and accordingly regulates and utilizes the optimum motor start up voltage is explained. In this embodiment, the mains voltage is run by the control unit.

In the state of the art U.S. Pat. No. 4,395,671, a motor wherein the momentary amplitude waveform of input voltage which is proportional to the main windings voltage is controlled and when the voltage of the auxiliary winding is less than the momentary amplitude, the auxiliary winding is deactivated is explained.

The aim of the present invention is the realization of a motor wherein the start up is adjusted according to variations in the mains voltage.

The motor realized in order to attain the aim of the present invention, explicated in the first claim and the respective claims thereof, starts up by the main winding and the auxiliary winding being actuated simultaneously. Actuation of the windings is maintained by delivering energy to the first and second triacs connected to the windings. After maintaining the motor start up, the energy delivered to the first triac connected to the auxiliary winding is cut off and the motor continues operating with the energy delivered to the second triac connected to the main winding. Energizing of the triacs is provided by means of a control unit.

The limit amplitude value of the voltage required for the start up of the motor is recorded in the memory of the control unit. The control unit measures the mains voltage and compares the measured voltage amplitude with the limit amplitude. If the amplitude of the mains voltage is less, the triacs are provided to be actuated at a phase angle corresponding to the high amplitude value of the mains voltage in order to attain the limit amplitude. If the amplitude of the mains voltage is high, the limit amplitude can also be provided at phase angles corresponding to the low amplitude values of the mains voltage. Therefore, the control unit provides to drive the triacs at the most optimum phase angle with respect to the measured mains voltage values. Accordingly, the triacs can be actuated at the desired angle with respect to the mains voltage.

In an embodiment of the present invention, the limit amplitude is recorded as 200V in the memory of the control unit. When the amplitude of the mains voltage is approximately below the limit amplitude, then the triacs are actuated for a longer than normal time period. Consequently, the start up of the motor is guaranteed.

In an embodiment of the present invention wherein the limit amplitude is 200V, while the mains voltage is between 200V-220V, the triacs are actuated when the mains voltage phase angle is around 60°.

In another embodiment of the present invention wherein the limit amplitude is 200V, while the mains voltage is more than 220V, the triacs are actuated when the mains voltage phase angle is around 10°. Since the mains voltage is considerably higher than limit amplitude, the triacs are actuated in a shorter than normal time period. Accordingly, an optimum amount of energy is consumed for the motor start up.

In an embodiment of the present invention, a sensor which measures the mains voltage and delivers the acquired information to the control unit is disposed.

In an embodiment of the present invention, the motor of the present invention is utilized as the compressor of the refrigerator.

In an embodiment of the present invention, the motor of the present invention is utilized as the compressor of the air conditioner.

By means of the present invention, the motor start up is realized at the optimum phase angles in different values of the mains voltage and too much energy consumption at high voltage values is prevented.

A motor realized in order to attain the aim of the present invention is illustrated in the attached claims, where:

FIG. 1—is the schematic view of a motor and a control unit of the present invention.

Figure 2:
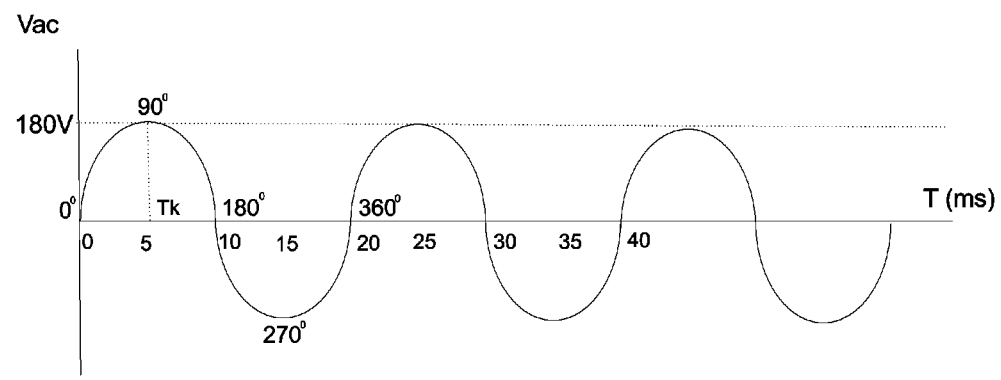

FIG. 2—is the graph showing mains voltage/motor start up time in an embodiment of the present invention.

Figure 3:
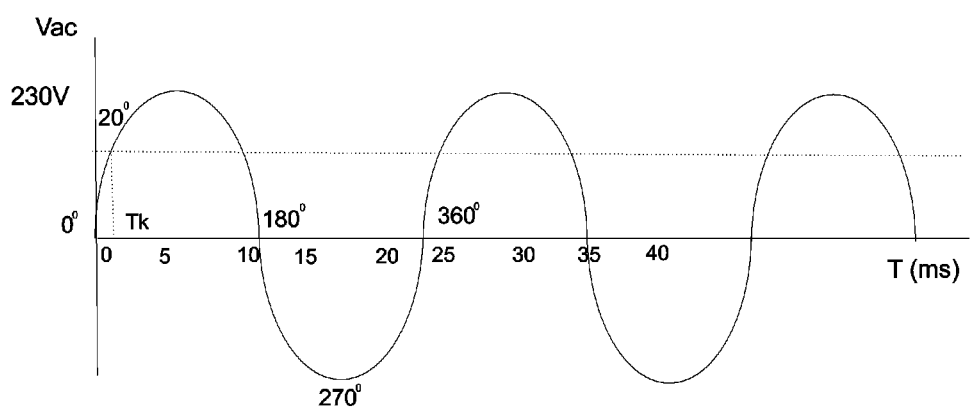

FIG. 3—is the graph showing mains voltage/motor start up time in another embodiment of the present invention.

The elements illustrated in the figures are numbered as follows:
1. Motor
2. First triac
3. Second triac
4. Control unit
5. Sensor The symbol list below is given in order to explicate the present invention.

Vac—Mains voltage $\lambda ac$ : Amplitude of mains voltage $\lambda_{limit}$ The minimum limit amplitude for actuating the triacs (2 and 3)

$\theta$: The phase angle of the mains voltage

The motor (1) of the present invention is fed by the mains voltage (Vac) and comprises a main winding (MW), an auxiliary winding (AW), a first triac (2) connected in series to the auxiliary winding (AW) which provides to start up the motor (1) by being actuated at the moment of start up in order to operate the motor (1), a second triac (3) connected in series to the main winding (MW) which provides the motor (1) to continue operating and a control unit (4) which controls the start up and operation of the motor (1) by actuating the triacs (2 and 3) when required. (FIG. 1).

The motor (1) furthermore comprises a control unit (4) which
  detects the sinusoidal voltage (Vac) of the mains voltage (Vac), has the minimum limit amplitude ($\lambda_{limit}$) whereat the triacs (2 and 3) can be actuated recorded in its memory, has the phase angles ($\theta$) determined for different amplitudes ($\lambda$ac) whereat the triacs (2 and 3) can be actuated recorded in its memory, actuates the triacs (2 and 3) when the voltage (Vac) is at the highest phase angle ($\theta$) if the voltage (Vac) amplitude ($\lambda$ac) is lower than the limit amplitude ($\lambda_{limit}$), actuates the triacs (2 and 3) at a different phase angle ($\theta$) of the voltage (Vac) if the voltage (Vac) amplitude ($\lambda$ac) is higher than the limit amplitude ($\lambda_{limit}$) (FIG. 2).

The control unit (4) detects the sinusoidal signal of the mains voltage (Vac) and determines the times (Tk) when the limit amplitude ($\lambda_{limit}$) is maintained whereat the motor (1) can start up by observing the phase angle($\theta$) of the voltage (Vac). Measuring the mains voltage (Vac) value from the limit amplitude ($\lambda_{limit}$) is maintained by determining the minimum amplitude ($\lambda_{limit}$) of the measured voltage (Vac) required for the start up of the motor (1). The control unit (4) determines the angle ($\theta$a) of the voltage (Vac) corresponding to the detected amplitude ($\lambda$ac) and actuates the triacs (2 and 3) when the voltage (Vac) comes to that angle ($\theta$a). Since the main winding (MW) and the auxiliary winding (AW) of the motor (1) are actuated when the limit amplitude ($\lambda_{limit}$) is maintained, the motor (1) start up is provided with the least amount of energy possible. Waste of time and energy is prevented by unnecessarily waiting to maintain high amplitude ($\lambda$ac).

For example, in the case the mains voltage (Vac) is 180 V, the limit amplitude ($\lambda_{limit}$) is maintained when the phase angle ($\theta$). is odd multiples of 90° (270°, 450° . . . ). In the case the mains voltage (Vac) is 190 V, the limit amplitude ($\lambda_{limit}$) is maintained when the phase angle ($\theta$) is multiples of 80° (110°, 260° . . . ). In the case the mains voltage (Vac) is 230 V, the limit amplitude ($\lambda_{limit}$) is maintained when the phase angle ($\theta$a) is multiples of 20° (160°, 200°. . . ). In this case, when the mains voltage (Vac) is for example 230 V, the motor (1) is started up by actuating the triacs (2 and 3) when the phase angle ($\theta$) reaches 20°. Consequently, unnecessary energy consumption is prevented by not starting up at a greater angle and the triacs (2 and 3) are protected from damages by being subject to high voltage (Vac). By means of recording the data thus obtained in its memory, the control unit (4) is enabled to determine at which angle ($\theta$a) the limit amplitude ($\lambda_{limit}$) is acquired which is calculated according to the mains voltage (Vac) (FIG. 3).

In an embodiment of the present invention, the limit amplitude ($\lambda_{limit}$) recorded in the control unit (4) is 200V. If the voltage (Vac) measured by the control unit (4) is less than 200V, the triacs (2 and 3) are actuated for a longer period of time (T). In order to attain the limit amplitude ($\lambda_{limit}$) (200V) necessary for start up of the motor (1) at low mains voltage (Vac), the triacs (2 and 3) are actuated at the highest absolute angle (90°, 270° . . . etc.) of the voltage (Vac). The actuation time (T) is provided to last longer that the actuation time (T) under normal conditions in order to guarantee acquiring the necessary energy at the same time. At the end of the actuation time (T), actuation of the auxiliary winding (AW) is ended and the motor (1) continues operating with the main winding (MW).

In a similar embodiment of the present invention, while the measured mains voltage (Vac) is between 200V-220V, the control unit (4) actuates the triacs (2 and 3) when the phase angle ($\theta$a) is approximately 60° or its odd multiples (150°, 240°).

In an embodiment of the present invention, if the measured mains voltage (Vac) is higher than 220V, the control unit (4) actuates the triacs (2 and 3) for a short time when the phase angle ($\theta$a) is approximately 90° or its odd multiples (approximately 180°, 360° . . . ) A low amplitude ($\lambda$ac) is sufficient in order to attain the optimum voltage (V) necessary for the start up of the motor (1) in high mains voltage (Vac). For this reason, the triacs (2 and 3) are actuated at an absolute low phase angle ($\theta$=10°, 170° . . . etc.) of the voltage (Vac). The triacs (2 and 3) are started to be actuated without waiting for the angle where high amplitude ($\lambda$ac) will be attained. Since the necessary energy will be acquired in a short period of time, the triac (2) of the auxiliary winding (AW) is short circuited after a time period shorter than the actuation time (T) utilized under normal conditions. Consequently, consumption of less energy is maintained at high mains voltage (Vac).

In an embodiment of the present invention, the motor (1) comprises a sensor (5) which detects the mains voltage (Vac) and delivers the result of the detection to the control unit (4) The sensor (5) is positioned between the mains and the control unit (4) (FIG. 2).

In an embodiment of the present invention, the control unit (4) is utilized in a compressor having a motor (1) which provides circulation of the refrigerant in the cooling system of the refrigerator.

In another embodiment of the present invention, the control unit (4) is utilized in a compressor having a motor (1) which provides circulation of the refrigerant in the cooling system of the air conditioner.

In the embodiment of the present invention, the mains voltage (Vac) is measured and the phase angle ($\theta$a) of the mains voltage (Vac) which enables attaining the limit amplitude ($\lambda_{limit}$) necessary for the motor (1) start up is determined. The triacs (2 and 3) of the main winding (MW) and the auxiliary winding (AW) of the motor (1) are actuated when the voltage (Vac) comes to the determined phase angle ($\theta$a) thus the motor (1) is started up by consuming the minimum amount of energy as possible.

It is to be understood that the present invention is not limited to the embodiments disclosed above and a person skilled in the art can easily introduce different embodiments. These should be considered within the scope of the protection postulated by the claims of the present invention.

The invention claimed is:

1. A motor (1) fed by the mains voltage (Vac) comprising a main winding (MW), an auxiliary winding (AW), a first triac (2) connected in series to the auxiliary winding (AW) which is actuated at start up, a second triac (3) connected in series to the main windings (MW) to provide continued operation and a control unit (4) which detects the voltage (Vac) as sinusoidal signal and actuates the first triac (2) and the second triac (3) to control the start-up and operation, and wherein the control unit (4) includes a memory containing a minimum limit amplitude ($\lambda_{limit}$) used for actuating the first triac (2) and the second triac (3), and phase angles ($\theta$) determined for different amplitude values used for actuating the first triac (2) and the second triac (3), and wherein the control unit (4) actuates the first triac (2) and the second triac (3) when a voltage (Vac) is at a maximum phase angle ($\theta_{max}$) if the voltage (Vac) amplitude ($\lambda_{ac}$) is lower than minimum the limit amplitude ($\lambda_{limit}$), or actuates the first triac (2) and the second triac (3) at a different phase angle ($\theta$) than the maximum phase angle ($\lambda_{max}$) of the voltage (Vac) if the voltage (Vac) amplitude ($\lambda_{ac}$) is higher than minimum the limit amplitude ($\lambda_{limit}$) and wherein the minimum limit amplitude ($\lambda_{limit}$) is 200V.

2. The motor as in claim 1 wherein the control unit (4) which actuates the first triac (2) and the second triac (3) when the phase angle ($\theta_a$) is approximately 60° and its odd multiples while the measured voltage (Vac) is between 200V-220V.

3. The motor as in claim 1 wherein the control unit (4) which actuates the first triac (2) and the second triac (3) when the phase angle ($\theta_a$) is approximately 180° and its odd multiples while the measured voltage (Vac) is higher than 220V.

4. The motor as in claims 1 further comprising a sensor (5) which detects the mains voltage (Vac) and delivers the result of the detection to the control unit (4).

5. The motor (1) of claim 1 further comprising a compressor for a refrigerator.

6. The motor (1) of claim 1 further comprising a compressor for an air conditioner.

7. A motor (1) fed by the mains voltage (Vac) comprising a main winding (MW), an auxiliary winding (AW), a first triac (2) connected in series to the auxiliary winding (AW) which is actuated at start up, a second triac (3) connected in series to the main windings (MW) to provide continued operation and a control unit (4) which detects the voltage (Vac) as sinusoidal signal and actuates the first triac (2) and the second triac (3) to control the start-up and operation, and wherein the control unit (4) includes a memory containing
a minimum limit amplitude ($\lambda_{limit}$) used for actuating the first triac (2) and the second triac (3), and phase angles ($\theta$) determined for different amplitude values used for actuating the first triac (2) and the second triac (3), and
wherein the control unit (4) actuates the first triac (2) and the second triac (3) when a voltage (Vac) is at a maximum phase angle ($\theta_{max}$) if the voltage (Vac) amplitude ($\lambda_{ac}$) is lower than the minimum limit amplitude ($\lambda_{limit}$), or actuates the first triac (2) and the second triac (3) at a different phase angle ($\theta$) than the maximum phase angle ($\theta_{max}$) of the voltage (Vac) if the voltage (Vac) amplitude ($\lambda_{ac}$) is higher than the minimum limit amplitude ($\lambda_{limit}$) and wherein the control unit (4) which actuates the first triac (2) and the second triac (3) is selected from the group consisting of the phase angle ($\theta_a$) of: approximately 60°, and its odd multiples, when the measured voltage (Vac) is between 200V-220V or approximately 180°, and its odd multiples, when the measured voltage (Vac) is higher than 220V.

* * * * *